US008331962B2

(12) United States Patent
Chang

(10) Patent No.: US 8,331,962 B2
(45) Date of Patent: Dec. 11, 2012

(54) SMS FORWARDING SERVICE FOR MOBILE DEVICES

(75) Inventor: Patricia R Chang, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 86 days.

(21) Appl. No.: 12/958,033

(22) Filed: Dec. 1, 2010

(65) Prior Publication Data
US 2012/0142380 A1    Jun. 7, 2012

(51) Int. Cl.
*H04W 4/12* (2009.01)
(52) U.S. Cl. ............... 455/466; 455/445; 455/414.1
(58) Field of Classification Search ............ 455/466, 455/412.1, 418, 415, 435.1, 406, 414.1, 445; 379/88.14, 142.07; 370/356, 329
See application file for complete search history.

(56) References Cited

U.S. PATENT DOCUMENTS

| | | | | |
|---|---|---|---|---|
| 7,269,431 | B1 * | 9/2007 | Gilbert | 455/466 |
| 7,319,880 | B2 * | 1/2008 | Sin | 455/466 |
| 7,761,105 | B2 * | 7/2010 | Harding | 455/466 |
| 8,060,124 | B1 * | 11/2011 | Fattaahi | 455/466 |
| 2002/0187794 | A1 * | 12/2002 | Fostick et al. | 455/466 |
| 2008/0171549 | A1 * | 7/2008 | Hursey et al. | 455/445 |
| 2008/0293389 | A1 * | 11/2008 | Chin et al. | 455/414.1 |
| 2009/0191840 | A1 * | 7/2009 | Piett et al. | 455/404.1 |

OTHER PUBLICATIONS

Wikipedia, "Network switching subsystem" http://en.wikipedia.org.wiki/Network_switching_subsystem, Nov. 4, 2010, 7 pages.
Wikipedia, "Short message service center" http://en.wikipedia.org/wiki/Short_message_service_center, Nov. 2, 2010, 2 pages.
Wikipedia, "SMS", http://en.wikipedia.org/wiki/SMS, Nov. 5, 2010, 10 pages.

* cited by examiner

*Primary Examiner* — Vladimir Magloire
*Assistant Examiner* — Mahendra Patel

(57) ABSTRACT

At least one network device is configured to activate a short message service (SMS) forwarding service for a first mobile device, where the SMS forwarding service forwards SMS messages, intended for the first mobile device, to a second mobile device. The at least one network device is further configured to receive, from a third mobile device, a SMS message intended for the first mobile device; determine, in response to the SMS message, that the SMS forwarding service has been activated for the first mobile device; identify the second mobile device to which to forward the SMS message, intended for the first mobile device, when the SMS forwarding service has been activated for the first mobile device; and automatically forward the SMS message to the second mobile device.

24 Claims, 10 Drawing Sheets

SMS FORWARDING SERVICE FOR MOBILE DEVICES

BACKGROUND

Call forwarding is a service on some telephone networks that allows an incoming call, directed to a particular telephone number, to be redirected to another telephone number specified by the called party. When the called party activates the service, software, typically in a telephone switch, redirects incoming calls to the specified telephone number rather than the telephone number to which the call was originally placed. No similar service exits for short message service (SMS) messages.

DETAILED DESCRIPTION OF PREFERRED EMBODIMENTS

The following detailed description refers to the accompanying drawings. The same reference numbers in different drawings may identify the same or similar elements.

An implementation, described herein, may provide a short message service (SMS) forwarding service for mobile devices. For example, a user, of a mobile device, may activate the SMS forwarding service and specify a unique identifier (e.g., a mobile directory number (MDN) (telephone number), an international mobile subscriber identity (IMSI), a network access identifier (NAI), etc.) of another mobile device to which to forward SMS messages. Thereafter, SMS messages, transmitted to the user's mobile device, may be automatically forwarded to the other mobile device specified by the user.

Figure 1:
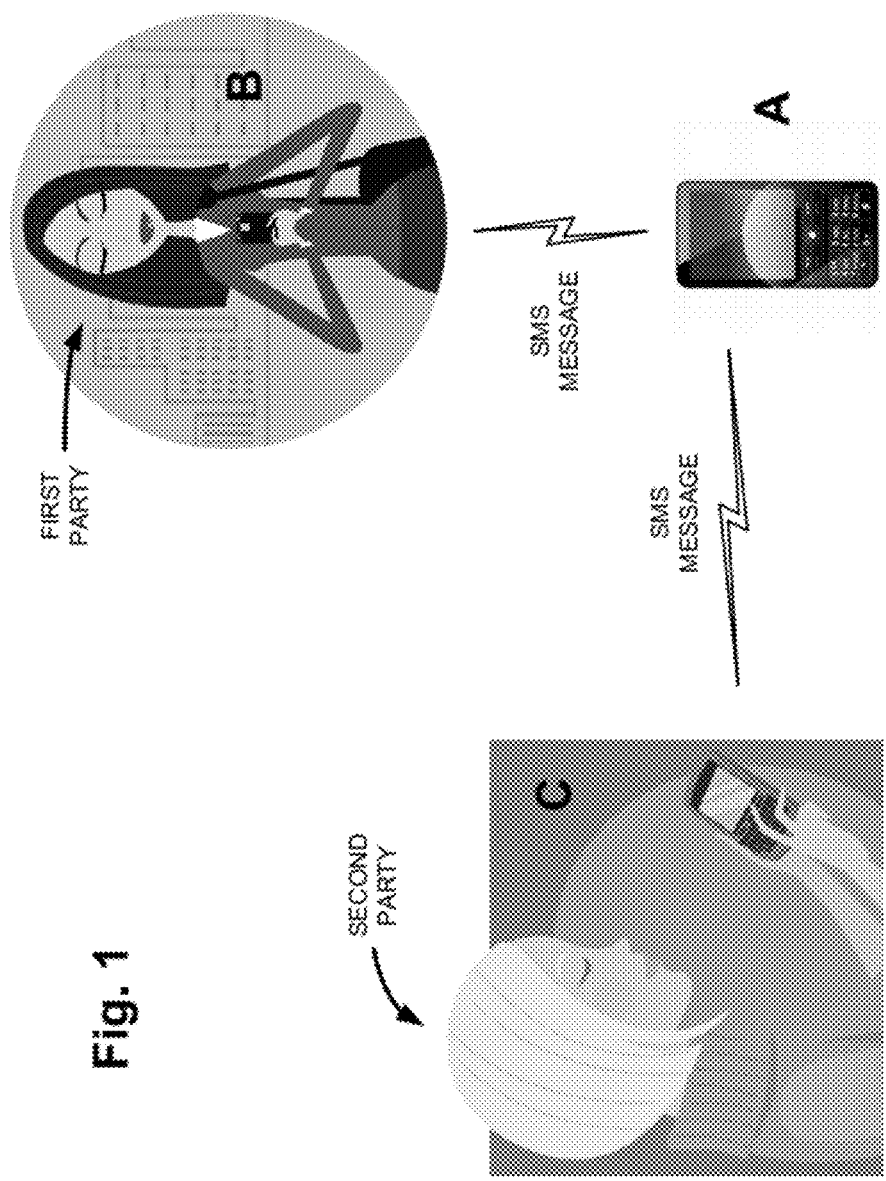
FIG. 1 is a diagram of an overview of an implementation described herein.

FIG. 1 is a diagram of an overview of an implementation described herein. For the example of FIG. 1, assume that a first party desires to transition from using mobile device A to using mobile device B. So that the first party does not miss any of her important messages, the first party activates a SMS forwarding service and specifies mobile device B as the mobile device to which the first party wants SMS messages forwarded. As shown in FIG. 1, a second party may use mobile device C to enter a SMS message intended for the first party at mobile device A. The second party may specify the first party by selecting or entering a telephone number for mobile device A. The second party may instruct mobile device C to send the SMS message to mobile device A. Because the first party has activated the SMS forwarding service, the SMS message may not be sent to mobile device A. Rather, the SMS message may be automatically forwarded to mobile device B. As a result, the first party can receive the SMS message, via mobile device B, even though the SMS message was sent by the second party to mobile device A.

The description to follow will describe the automatic forwarding of SMS messages. The description is not limited to SMS messages, however, and may also apply to other types of text messages.

Figure 2:
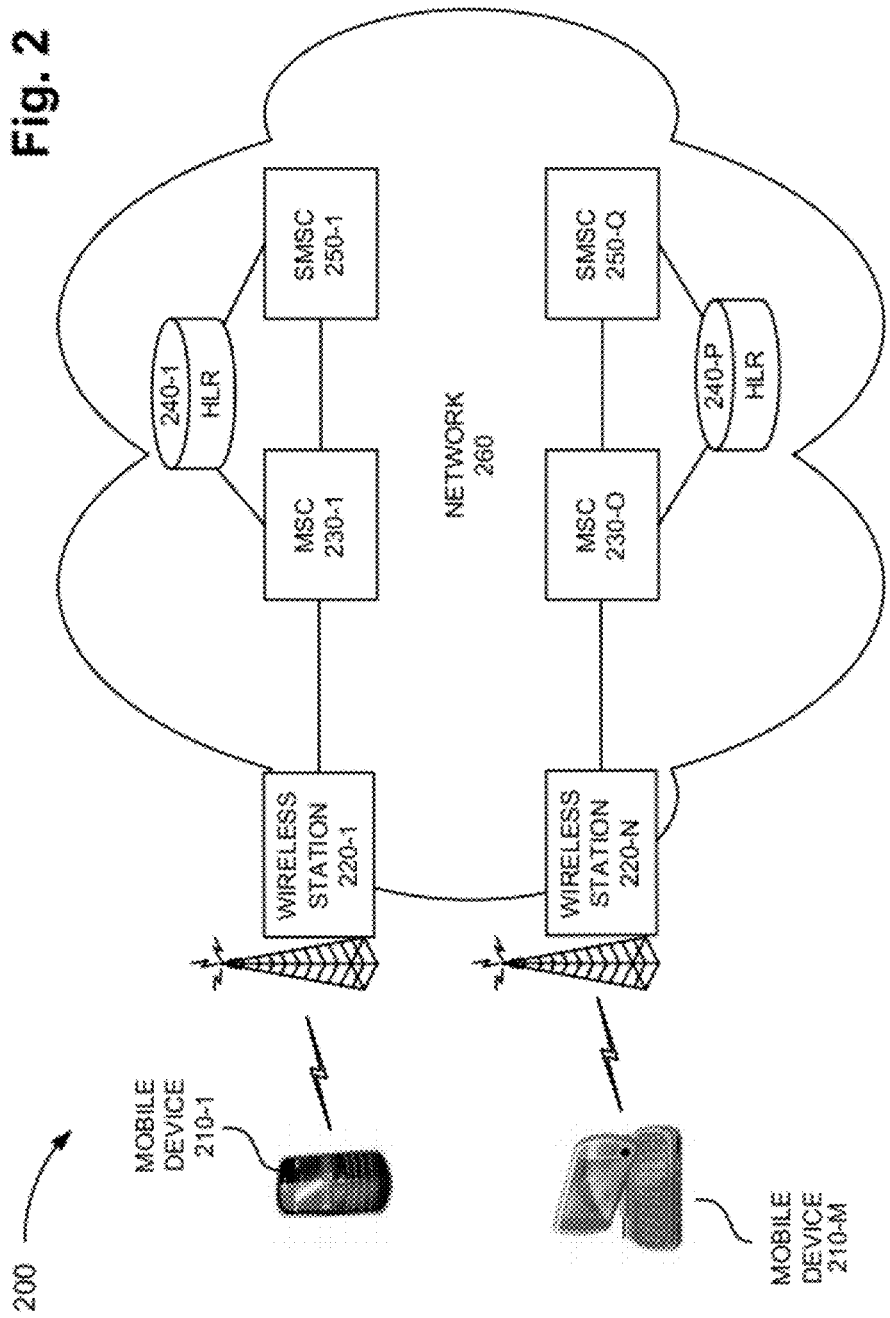
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include mobile devices 210-1, . . . , 210-M (where M≧1) (collectively referred to as "mobile devices 210," and individually as "mobile device 210"), wireless stations 220-1, . . . , 220-N (where N≧1) (collectively referred to as "wireless stations 220," and individually as "wireless station 220"), mobile switching centers (MSCs) 230-1, . . . , 230-O (where O≧1) (collectively referred to as "MSCs 230," and individually as "MSC 230"), home location registers (HLRs) 240-1, . . . , 240-P (where P≧1) (collectively referred to as "HLRs 240," and individually as "HLR 240"), and short message service centers (SMSCs) 250-1, . . . , 250-Q (where Q≧1) (collectively referred to as "SMSCs 250," and individually as "SMSC 250"). As shown in FIG. 2, wireless stations 220, MSCs 230, HLRs 240, and/or SMSCs 250 may form a network 260 that provides wireless telecommunication services to mobile devices 210.

While FIG. 2 shows a particular number and arrangement of devices, in practice, environment 200 may include additional, fewer, different, or differently arranged devices than are shown in FIG. 2. For example, network 260 may contain additional devices that are common to wireless networks, such as a visitor location register (VLR) or a gateway MSC (GMSC).

Also, although certain connections are shown in FIG. 2, these connections are simply examples and additional or different connections may exist in practice. For example, SMSC 250-1 may connect (directly or indirectly) to MSC 230-O and/or HLR 240-P. Similarly, SMSC 250-Q may connect (directly or indirectly) to MSC 230-1 and/or HLR 240-1.

Further, each wireless station 220, MSC 230, HLR 240, or SMSC 250 may be implemented as multiple, possibly distributed, devices. Alternatively, two or more of wireless station 220, MSC 230, HLR 240, or SMSC 250 may be implemented within a single device.

Mobile device 210 may include any portable device capable of communicating via a network, such as network 260. For example, mobile device 210 may correspond to a mobile communication device (e.g., a mobile phone or a personal digital assistant (PDA)), a portable computer device (e.g., a laptop or a tablet computer), or another type of portable device.

Wireless station 220 may include a device, or a collection of devices, that functions as an access point to network 260. Wireless station 220 may perform various tasks, such as transcoding of speech channels, allocation of radio channels to mobile devices 210, paging, SMS messaging, and transmission and reception over an air interface. In one implementation, wireless station 220 may include an antenna, a base transceiver station (BTS), and/or a base station controller (BSC). The antenna may include one or more directional or omni-directional antennas. The BTS may include components for transmitting and receiving radio signals and/or encrypting and decrypting communications with the BSC. The BSC may be the intelligence behind one or more BTSs. The BSC may handle allocation of radio channels, control handovers from one BTS to another BTS, receive measurements from mobile devices 210, and/or store information, such as carrier frequencies, frequency hopping lists, power reduction levels, and receiving levels.

MSC 230 may include a device, or a collection of devices, that functions as the primary service delivery node for network 260. For example, MSC 230 may handle the routing of voice calls and SMS messages, as well as other services, such as conference call and facsimile services. MSC 230 may set up and release end-to-end connections, handle mobility and hand-over requirements during a voice call, and/or manage billing for voice calls.

HLR 240 may include a device, or a collection of devices, that stores details for a set of mobile devices 210 that are authorized to use network 260. HLR 240 may store particular information for each mobile device 210 for which HLR 240 is responsible, such as a unique identifier for mobile device 210, a telephone number (e.g., a mobile services integrated services digital network (MSISDN)) for mobile device 210, a current location of mobile device 210, an identity of a MSC 230 and a SMSC 250 with which mobile device 210 is associated, and/or a list of services requested or available to mobile device 210 (e.g., SMS forwarding). In one implementation, the list of services may include a SMS forwarding service. In this implementation, HLR 240 may include information regarding a telephone number (e.g., a MSISDN) for another mobile device 210 to which SMS messages, intended for mobile device 210, are to be forwarded.

SMSC 250 may include a device, or a collection of devices, that handles the delivery of SMS messages. SMSC 250 may receive SMS messages for a set of mobile devices 210, for which SMSC 250 is responsible, and may manage the delivery of the SMS messages to these mobile devices 210. When a mobile device 210 is unavailable, SMSC 250 may store a SMS message, intended for that mobile device 210, until mobile device 210 becomes available. In one implementation, SMSC 250 may store a SMS message for a period of time and thereafter delete the SMS message even if the SMS message has not been delivered to a mobile device 210.

SMSC 250 may store certain information regarding a mobile device 210. For example, SMSC 250 may store information identifying a HLR 240 associated with mobile device 210. Additionally, or alternatively, SMSC 250 may store a SMS message intended for mobile device 210. Additionally, or alternatively, SMSC 250 may store information regarding whether SMS forwarding has been activated, and information regarding a mobile device 210 to which SMS messages are to be automatically forwarded (e.g., a telephone number of that mobile device 210).

Figure 3:
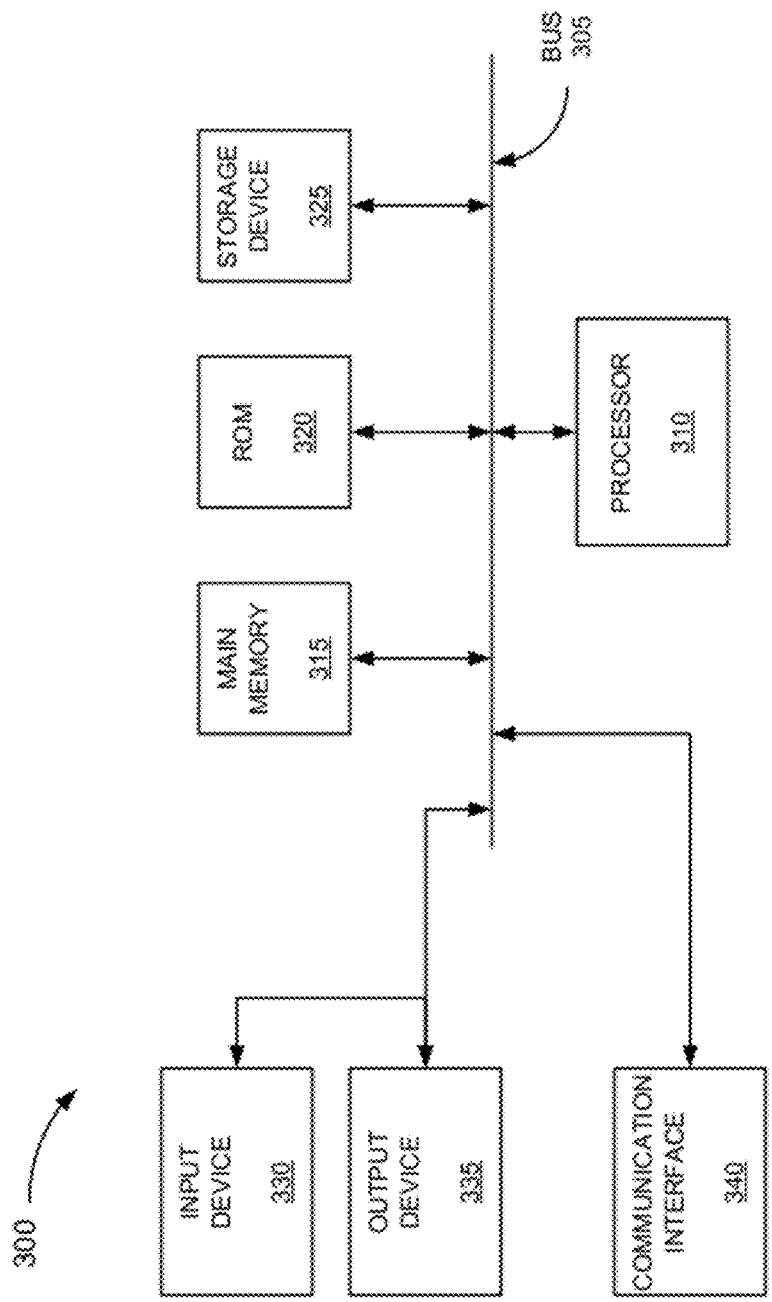
FIG. 3 is a diagram of example components of a device that may be used within the environment of FIG. 2.

FIG. 3 is a diagram of example components of a device 300. Device 300 may correspond to wireless station 220, MSC 230, HLR 240, or SMSC 250. Each of wireless station 220, MSC 230, HLR 240, and SMSC 250 may include one or more devices 300.

As shown in FIG. 3, device 300 may include a bus 305, a processor 310, a main memory 315, a read only memory (ROM) 320, a storage device 325, an input device 330, an output device 335, and a communication interface 340. In another implementation, device 300 may include additional, fewer, different, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices (e.g., mobile devices 210) or networks (e.g., network 260). In one implementation, communication interface 340 may include a wireless interface and/or a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
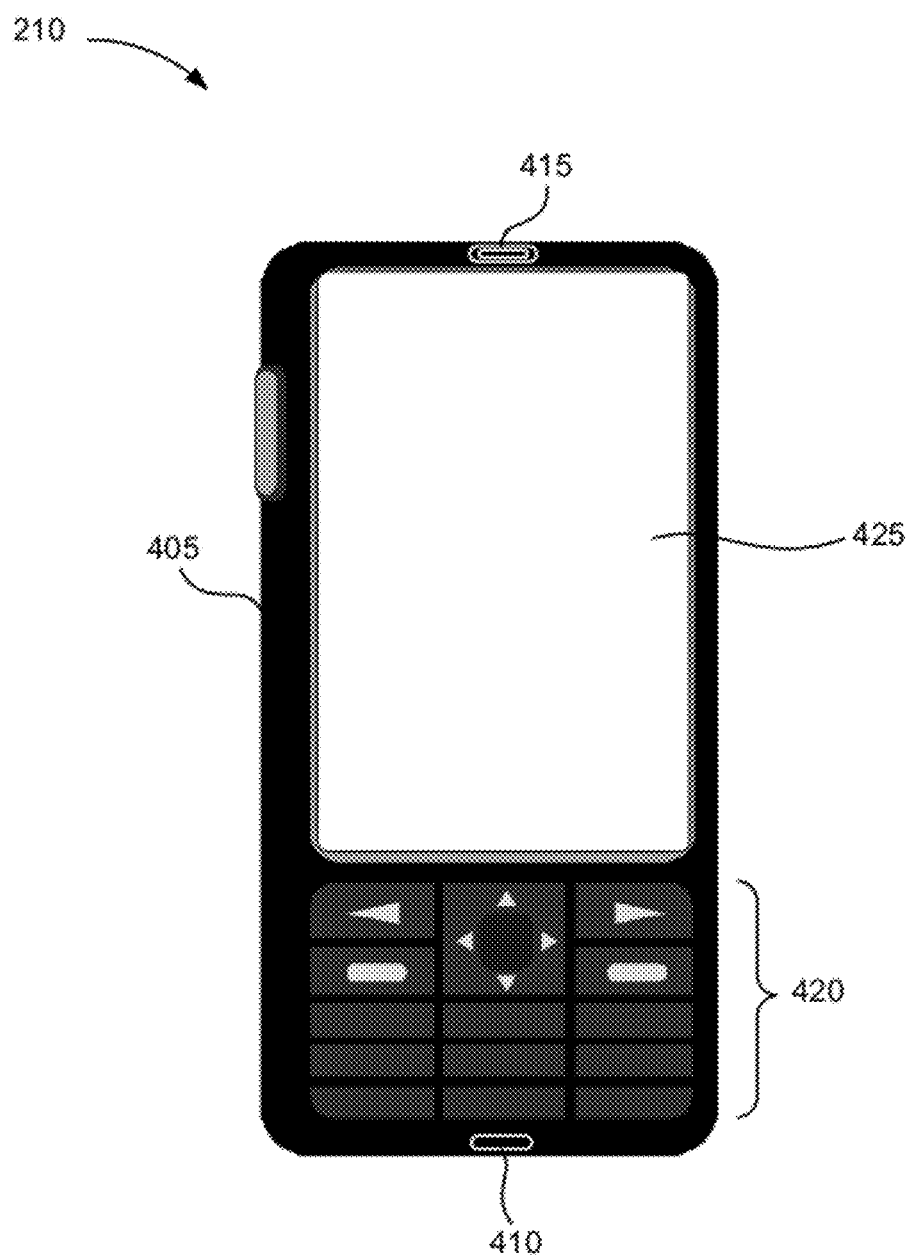
FIG. 4 is a diagram of an example mobile device of FIG. 2.

FIG. 4 is a diagram of an example implementation of mobile device 210. In the implementation shown in FIG. 4, mobile device 210 may correspond to a mobile communication device. Mobile device 210 may include a housing 405, a microphone 410, a speaker 415, a keypad 420, and a display 425. In another implementation, mobile device 210 may include fewer, additional, different, or differently arranged components than those illustrated in FIG. 4 and described herein. For example, keypad 420 may be implemented on a touch screen of display 425.

Housing 405 may include a structure to contain components of mobile device 210. For example, housing 405 may be formed from plastic, metal, or some other material. Housing 405 may support microphone 410, speaker 415, keypad 420, and display 425.

Microphone 410 may include an input device that converts a sound wave to a corresponding electrical signal. For example, the user may speak into microphone 410 during a telephone call or to execute a voice command. Speaker 415 may include an output device that converts an electrical signal to a corresponding sound wave. For example, the user may listen to music, listen to a calling party, or listen to other auditory signals through speaker 415.

Keypad 420 may include an input device that provides input into mobile device 210. Keypad 420 may include a standard telephone keypad, a QWERTY keyboard, or some other type or arrangement of keys. Keypad 420 may also, or alternatively, include one or more special purpose keys. The user may utilize keypad 420 as an input component to mobile device 210. For example, the user may use keypad 420 to enter information, such as alphanumeric text, to access data, or to invoke a function, a service, or an operation. As described above, keypad 420 may be implemented not as physical keys, but rather as virtual keys on a touch screen of display 425.

Display 425 may include an output device that outputs visual content, or may include an input device that receives user input (e.g., a touch screen (also known as a touch display)). Display 425 may be implemented according to a variety of display technologies, including but not limited to, a liquid crystal display (LCD), a plasma display panel (PDP), a field emission display (FED), a thin film transistor (TFT) display, or some other type of display technology. Additionally, display 425 may be implemented according to a variety of sensing technologies, including but not limited to, capacitive sensing, surface acoustic wave sensing, resistive sensing, optical sensing, pressure sensing, infrared sensing, gesture sensing, etc. Display 425 may be implemented as a single-point input device (e.g., capable of sensing a single touch or point of contact) or a multipoint input device (e.g., capable of sensing multiple touches or points of contact that occur at substantially the same time).

Figure 5:
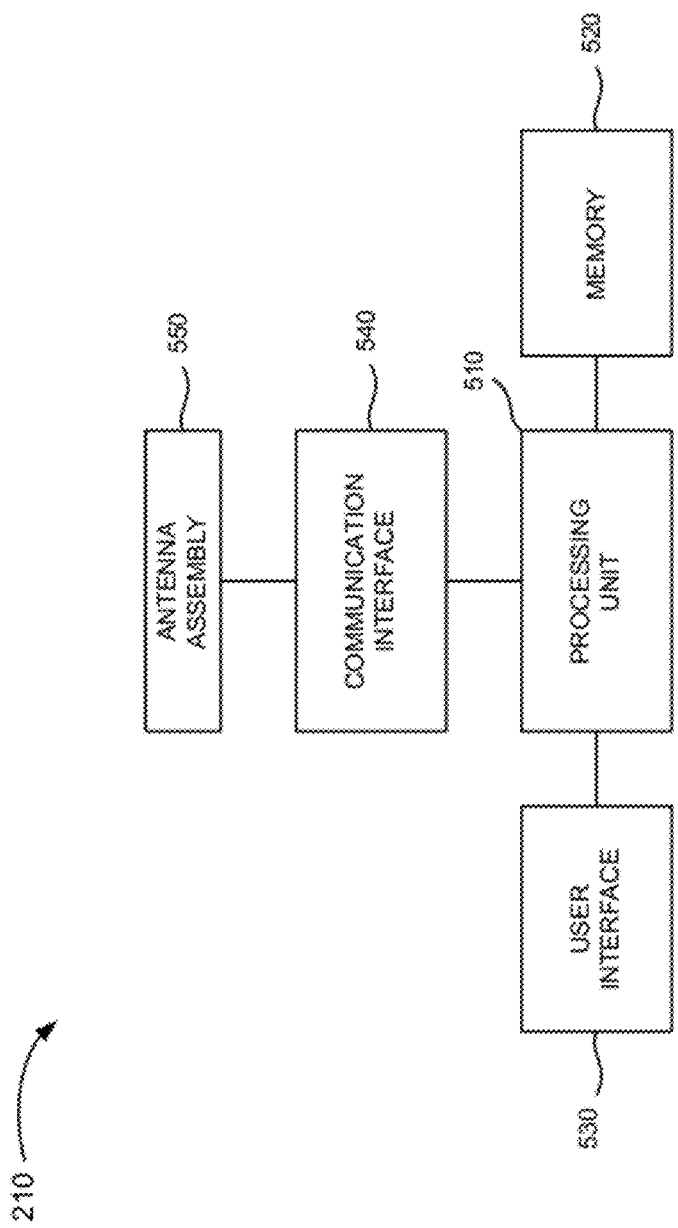
FIG. 5 is a diagram of example components of the mobile device of FIG. 4.

FIG. 5 is a diagram illustrating example components of mobile device 210. As illustrated, mobile device 210 may include a processing unit 510, a memory 520, a user interface 530, a communication interface 540, and an antenna assembly 550. In another implementation, mobile device 210 may include fewer, additional, different, or differently arranged components than those illustrated in FIG. 5. Additionally, in other implementations, a function described as being performed by a particular component of mobile device 210 may be performed by a different component of mobile device 210.

Processing unit 510 may include one or more processors, microprocessors, data processors, co-processors, network processors, ASICs, controllers, programmable logic devices (PLDs), chipsets, FPGAs, or other components that may interpret or execute instructions or data. Processing unit 510 may control the overall operation, or a portion thereof, of mobile device 210, based on, for example, an operating system (not illustrated) and/or various applications. Processing unit 510 may access instructions from memory 520, from other components of mobile device 210, or from a source external to mobile device 210 (e.g., a network or another device).

Memory 520 may include memory or secondary storage. For example, memory 520 may include a RAM, a dynamic RAM (DRAM), a ROM, a programmable ROM (PROM), a flash memory, or some other type of memory. Memory 520 may include a hard disk (e.g., a magnetic disk, an optical disk, a magneto-optic disk, a solid state disk, etc.) or some other type of computer-readable medium, along with a corresponding drive. Memory 520 may store data, applications, or instructions related to the operation of mobile device 210. For example, memory 520 may include a variety of applications, such as a SMS application, a navigation application, an e-mail application, a telephone application, a camera application, a voice recognition application, a multi-media application, a music player application, a visual voicemail application, a contacts application, a data organizer application, a calendar application, an instant messaging application, a web browsing application, a blogging application, or other types of applications (e.g., a word processing application, a spreadsheet application, etc.). The SMS application may permit a user, of mobile device 210, to send, receive, or process a SMS message.

User interface 530 may include components for inputting information to mobile device 210 and for outputting information from mobile device 210. Examples of input and output components might include a speaker (e.g., speaker 415) to receive electrical signals and output audio signals, a microphone (e.g., microphone 410) to receive audio signals and output electrical signals, buttons (e.g., keypad 420) to permit data and control commands to be input into mobile device 210, a display (e.g., display 425) to output visual information, or a vibrator to cause mobile device 210 to vibrate.

Communication interface 540 may include, for example, a transmitter that may convert baseband signals from processing unit 510 to radio frequency (RF) signals and/or a receiver that may convert RF signals to baseband signals. Alternatively, communication interface 540 may include a transceiver to perform functions of both a transmitter and a receiver. Communication interface 540 may connect to antenna assembly 550 for transmission and reception of the RF signals.

Antenna assembly 550 may include one or more antennas to transmit and receive RF signals over the air. Antenna assembly 550 may receive RF signals from communication interface 540 and transmit the signals over the air, and may receive RF signals over the air and provide the signals to communication interface 540.

As described herein, mobile device 210 may perform certain operations in response to processing unit 510 executing software instructions contained in a computer-readable medium, such as memory 520. The software instructions may be read into memory 520 from another computer-readable medium or from another device via communication interface 540. The software instructions contained in memory 520 may cause processing unit 510 to perform processes described herein. Alternatively, hardwired circuitry may be used in place of or in combination with software instructions to implement processes described herein. Thus, implementations described herein are not limited to any specific combination of hardware circuitry and software.

Figure 6:
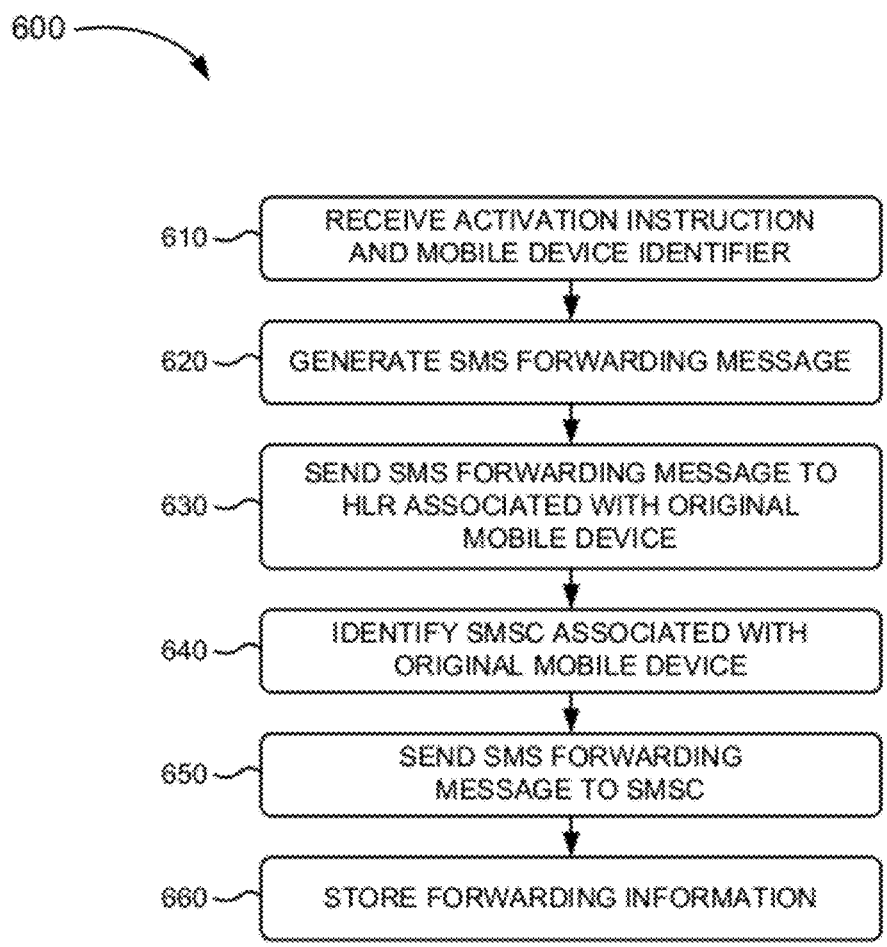
FIG. 6 is a flowchart of an example process for activating a short message service (SMS) forwarding service.

FIG. 6 is a flowchart of an example process 600 for activating a SMS forwarding service. In one implementation, process 600 may be performed by one or more devices in network 260, such as MSC 230, HLR 240, and/or SMSC 250. In another implementation, one or more blocks of process 600 may be performed by one or more other devices, or a group of devices including or excluding MSC 230, HLR 240, and/or SMSC 250.

Process 600 may include receiving an activation instruction and a mobile device identifier (block 610). For example, a user, of a mobile device 210 (hereinafter "original mobile device"), may input an instruction into the original mobile device to indicate to network 260 that the user desires to activate a SMS forwarding service. In one implementation, the user may input an activation code into the original mobile device, such as *92 or #97, to activate the SMS forwarding service. A wireless service provider (e.g., a wireless provider associated with network 260) may provide certain codes for activating and deactivating certain available services. For example, the wireless service provider may provide a first code for activating a voice call forwarding service, a second code for activating a SMS forwarding service, a third code for activating both voice call forwarding and SMS forwarding services, a fourth code for deactivating the voice call forwarding service, a fifth code for deactivating the SMS forwarding service, and a sixth code for deactivating both the voice call forwarding and SMS forwarding services. The code for activating a particular service (e.g., SMS forwarding) may be the same as the code for deactivating that particular service.

In another implementation, the user may provide an instruction for activating the SMS forwarding service in a manner other than inputting a particular code into the original mobile device. For example, the user may audibly provide the instruction (e.g., "activate SMS forwarding") or may use the original mobile device (or another device, such as a computer) to activate the SMS forwarding service via a website associated with the wireless service provider.

In either implementation, the user may provide an identifier of another mobile device 210 (hereinafter "destination mobile device") to which SMS messages are to be forwarded. For example, the user may input a particular string that includes the activation code and the telephone number of the destination mobile device to which SMS messages are to be forwarded (e.g., *921234567890, where *92 is the activation code and 123-456-7890 is the telephone number of the destination mobile device).

For extra security, the user may be required to enter a password (or the like) before permitting SMS forwarding to be activated. For example, the original mobile device may store a password (or the like) that is required to be inputted into the original mobile device before the original mobile device permits entry of or accepts the activation instruction and the mobile device identifier. Alternatively, the password (or the like) may be stored by a device in network 260 (e.g., SMSC 250) and when a received password matches the stored password, the SMS forwarding service may be activated.

The original mobile device may generate a message based on the activation instruction received from the user and send the message to MSC 230 associated with the original mobile device. In one implementation, the original mobile device may transmit the message to MSC 230 via wireless station 220. MSC 230 may receive the message from the original mobile device.

A SMS forwarding message may be generated (block 620). For example, MSC 230 may generate a SMS forwarding message that includes information for activating the SMS forwarding service, a unique identifier (e.g., MDN, IMSI, NAI, etc.) associated with the destination mobile device to which SMS messages are to be forwarded, and a telephone number of the original mobile device.

The SMS forwarding message may be sent to HLR 240 associated with the original mobile device (block 630). For example, MSC 230 may identify the particular HLR 240 with which the original mobile device is associated. MSC 230 may identify the particular HLR 240 via a look up based, for example, on the telephone number of the original mobile device. MSC 230 may then send the SMS forwarding message to HLR 240.

A SMSC 250, associated with the original mobile device, may be identified (block 640). For example, HLR 240 may perform a look up, based, for example, on the telephone number of the original mobile device, to identify SMSC 250 associated with the original mobile device. HLR 240 may also store information, associated with the SMS forwarding, in memory. The information might include an indicator that the SMS forwarding service has been activated for the original mobile device.

A SMS forwarding message may be sent to SMSC 250 (block 650). For example, HLR 240 may generate a SMS forwarding message, modify the SMS forwarding message received from MSC 230, or use the SMS forwarding message received from MSC 230. The SMS forwarding message may inform SMSC 250 that SMS messages received for the original mobile device are to be forwarded to the destination mobile device.

Forwarding information may be stored (block 660). For example, SMSC 250 may store information, in association with the original mobile device, that indicates that SMS messages, intended for the original mobile device, are to be forwarded to the destination mobile device. In one implementation, SMSC 250 may send, to the original mobile device or the destination mobile device, a confirmation that SMS forwarding has been activated. The original mobile device or the destination mobile device may, in response to the confirmation, present an indicator on a display (e.g., display 425 in FIG. 4) of the original mobile device or the destination mobile device indicating that SMS forwarding has been activated.

Figure 7:
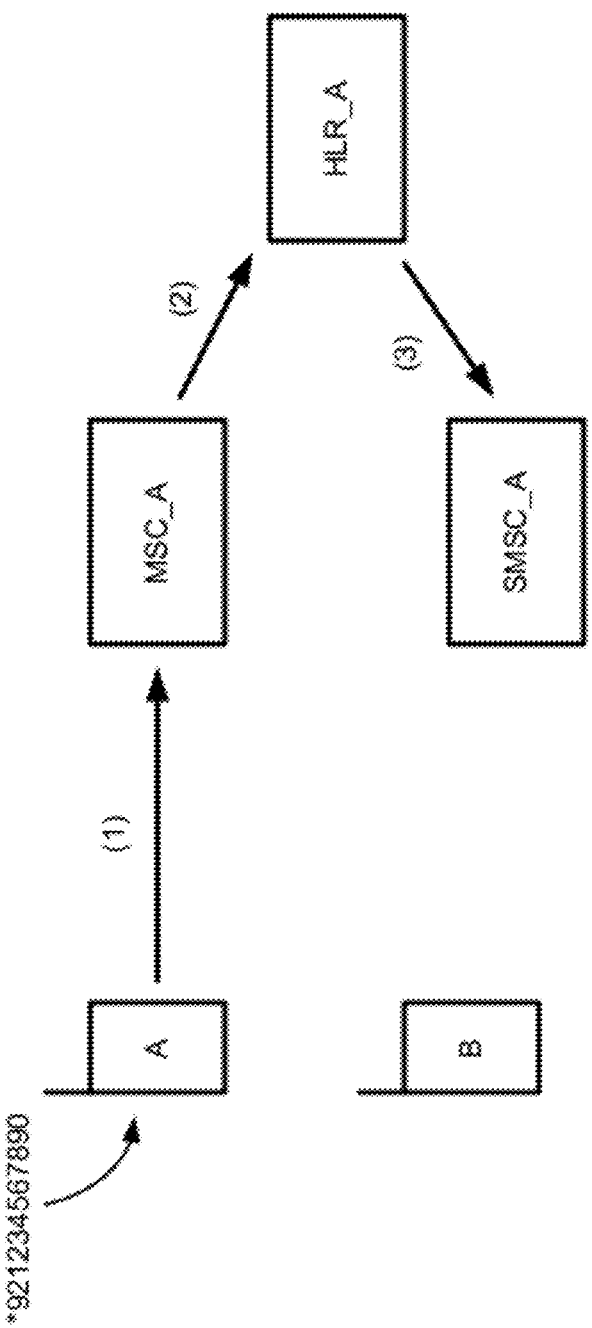
FIG. 7 illustrates an example of activating a SMS forwarding service.

FIG. 7 illustrates an example of activating a SMS forwarding service. As shown in FIG. 7, assume that a user of mobile device A desires to have SMS messages, intended for mobile device A, automatically forwarded to mobile device B. In this case, the user may input certain information into mobile device A to express the user's desire to activate the SMS forwarding service and forward SMS messages to mobile device B. For example, the user might input, into mobile device A, an activation code associated with the SMS forwarding service (e.g., "*92") and a telephone number associated with mobile device B (e.g., 123-456-7890).

Mobile device A may generate a message, based on the activation code and the telephone number for mobile device B, and may send the message to the MSC associated with mobile device A (MSC_A), shown as (1) in FIG. 7. MSC_A may generate a SMS forwarding message based on the message from mobile device A. MSC_A may identify the HLR associated with mobile device A (HLR_A). MSC_A may send the SMS forwarding message to HLR_A, shown as (2) in FIG. 7.

HLR_A may receive the SMS forwarding message and may record information, associated with the SMS forwarding, in memory in association with mobile device A. HLR_A may identify a SMSC associated with mobile device A (SMSC_A). HLR_A may send a SMS forwarding message to SMSC_A, shown as (3) in FIG. 7. The SMS forwarding message may be the same as or different from the SMS forwarding message received by HLR_A.

SMSC_A may record information associated with the SMS forwarding in memory. The information may identify mobile device A, mobile device B, and indicate that SMS messages, intended for mobile device A, are to be sent to mobile device B.

Figure 8:
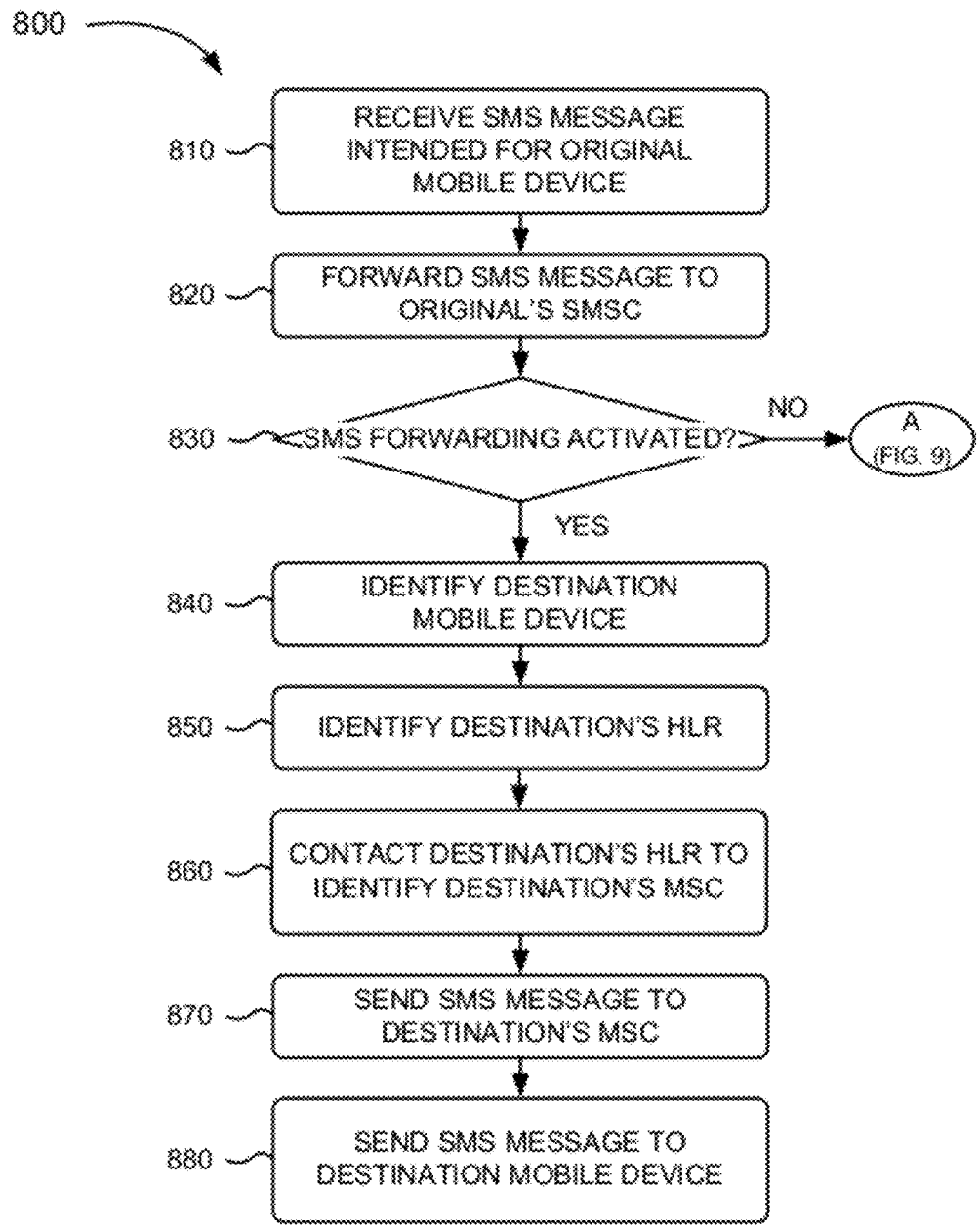
FIGS. 8 and 9 are a flowchart of an example process for invoking a SMS forwarding service.
Figure 9:
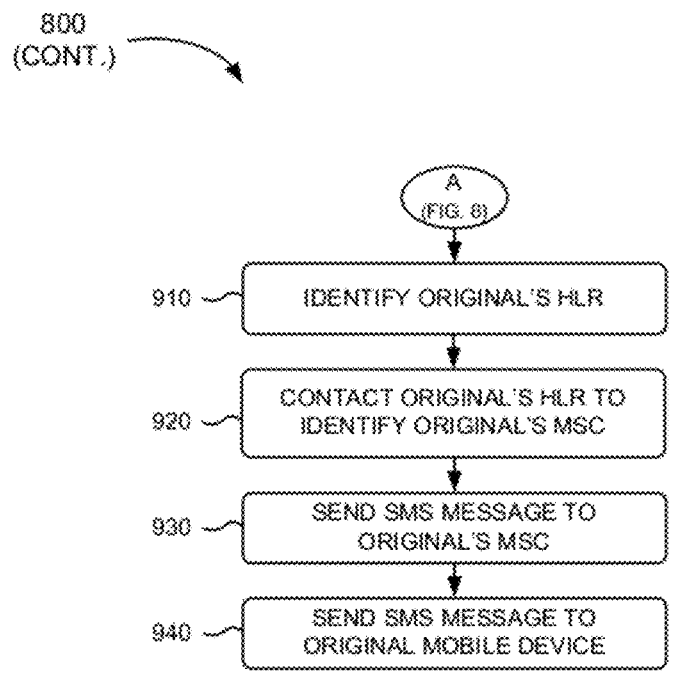

FIGS. 8 and 9 are a flowchart of an example process 800 for invoking a SMS forwarding service. In one implementation, process 800 may be performed by one or more devices in network 260, such as MSC 230, HLR 240, and/or SMSC 250. In another implementation, one or more blocks of process 800 may be performed by one or more other devices, or a group of devices including or excluding MSC 230, HLR 240, and/or SMSC 250.

Process 800 may include receiving a SMS message intended for a mobile device 210 (referred to as "original mobile device," consistent with the description of process 600 of FIG. 6) (block 810) (FIG. 8). For example, assume that a first party has activated a SMS forwarding service such that SMS messages, intended for the original mobile device, are automatically forwarded to another mobile device 210 (referred to as "destination mobile device," consistent with the description of process 600 of FIG. 6).

Assume that, at some point after the first party has activated the SMS forwarding service, a second party sends a SMS message to the original mobile device. The second party may activate a SMS application on the second party's mobile device 210 and select an option to create a new SMS message.

The second party may enter text for the SMS message and specify an identifier for the original mobile device (e.g., input a telephone number for the original mobile device or select a telephone number, for the original mobile device, from an address book). The second party may then instruct the second party's mobile device 210 to send the SMS message by selecting an appropriate option on the second party's mobile device 210. The second party's mobile device 210 may output the SMS message to a MSC 230 associated with the second party's mobile device 210. MSC 230 may receive the SMS message via a wireless station 220.

The SMS message may be forwarded to a SMSC 250 associated with the original mobile device (block 820). For example, MSC 230, associated with the second party's mobile device 210, may analyze the SMS message to identify the original mobile device. Based on the original mobile device, MSC 230 may perform a look up operation to identify a SMSC 250 associated with the original mobile device. In one implementation, MSC 230 may perform the look up operation using, for example, an identifier (e.g. telephone number) associated with the original mobile device. Alternatively, MSC 230 may contact a HLR 240 (or another network device associated with the original mobile device) to obtain the identity of SMSC 250 associated with the original mobile device. MSC 230 may send the SMS message to SMSC 250 associated with the original mobile device.

It may be determined whether SMS forwarding has been activated (block 830). For example, SMSC 250, associated with the original mobile device, may receive the SMS message. SMSC 250 may analyze the SMS message to identify a mobile device 210 to which the SMS message is intended (in this case, the original mobile device). SMSC 250 may analyze stored information, associated with the original mobile device, to determine whether the original mobile device has activated SMS forwarding.

If SMS forwarding has been activated (block 830—YES), the destination mobile device may be identified (block 840). For example, SMSC 250 may identify, from stored information associated with the original mobile device, an identifier (e.g., telephone number) associated with the destination mobile device.

A HLR 240, associated with the destination mobile device, may be identified (block 850). For example, SMSC 250 may perform a look up operation to identify a HLR 240 associated with the destination mobile device. In one implementation, SMSC 250 may use an identifier (e.g., telephone number) associated with the destination mobile device to determine which HLR 240 is associated with the destination mobile device.

HLR 240 may be contacted to identify a MSC 230 associated with the destination mobile device (block 860). For example, SMSC 250 may send, to HLR 240, a request for the identity of a MSC 230 associated with the destination mobile device. HLR 240 may receive the request and perform a look up operation to identify the appropriate MSC 230. In one implementation, HLR 240 may perform the look up operation based on an identifier (e.g., telephone number) associated with the destination mobile device. HLR 240 may send information identifying MSC 230, associated with the destination mobile device, to SMSC 250.

The SMS message may be sent to MSC 230 associated with the destination mobile device (block 870). For example, SMSC 250 may receive information identifying MSC 230 associated with the destination mobile device, and may send the SMS message to that MSC 230 for delivery to the destination mobile device.

The SMS message may be sent to the destination mobile device (block 880). For example, MSC 230, associated with the destination mobile device, may receive the SMS message from SMSC 250. MSC 230 may coordinate the transmission of the SMS message to the destination mobile device. For example, MSC 230 may obtain and/or maintain information regarding the availability of mobile devices 210 for which MSC 230 is responsible. If the destination mobile device is available to receive the SMS message, then MSC 230 may transmit the SMS message to the destination mobile device. If the destination mobile device is unavailable to receive the SMS message, then MSC 230 may transmit the SMS message back to SMSC 250 to temporarily store the SMS message for delivery at a later time. Alternatively, MSC 230 may transmit the SMS message to a SMSC 250, associated with the destination mobile device, to temporarily store the SMS message for later delivery after the destination mobile device becomes available.

If SMS forwarding has not been activated (block 830—NO), a HLR 240, associated with the original mobile device, may be identified (block 910) (FIG. 9). For example, SMSC 250 may perform a look up operation to identify a HLR 240 associated with the original mobile device. In one implementation, SMSC 250 may use an identifier (e.g., telephone number) associated with the original mobile device to determine which HLR 240 is associated with the original mobile device.

HLR 240 may be contacted to identify a MSC 230 associated with the original mobile device (block 920). For example, SMSC 250 may send, to HLR 240, a request for the identity of a MSC 230 associated with the original mobile device. HLR 240 may receive the request and perform a look up operation to identify the appropriate MSC 230. In one implementation, HLR 240 may perform the look up operation based on an identifier (e.g., telephone number) associated with the original mobile device. HLR 240 may send information identifying MSC 230, associated with the original mobile device, to SMSC 250.

The SMS message may be sent to MSC 230 associated with the original mobile device (block 930). For example, SMSC 250 may receive information identifying MSC 230 associated with the original mobile device, and may send the SMS message to that MSC 230 for delivery to the original mobile device.

The SMS message may be sent to the original mobile device (block 940). For example, MSC 230, associated with the original mobile device, may receive the SMS message from SMSC 250. MSC 230 may coordinate the transmission of the SMS message to the original mobile device. For example, MSC 230 may obtain and/or maintain information regarding the availability of mobile devices 210 for which MSC 230 is responsible. If the original mobile device is available to receive the SMS message, then MSC 230 may transmit the SMS message to the original mobile device. If the original mobile device is unavailable to receive the SMS message, then MSC 230 may transmit the SMS message back to SMSC 250 to temporarily store the SMS message for delivery when the original mobile device later becomes available.

While the description of process 800 included a single SMS message forwarding operation, there could be multiple forwarding operations. For example, the SMS forwarding service may be activated to forward SMS messages, intended to be sent to a first mobile device, to a second mobile device; and the SMS forwarding service may be activated to forward SMS messages, intended to be sent to the second mobile device, to a third mobile device. In this scenario, a SMS message, intended to be sent to the first mobile device, may be forwarded to the third mobile device.

Certain techniques may be used to avoid looping, where a SMS message is repeatedly forwarded between two (or more) mobile devices. For example, the SMS forwarding service may be activated to forward SMS messages, intended to be sent to a first mobile device, to a second mobile device; and the SMS forwarding service may be activated to forward SMS messages, intended to be sent to the second mobile device, to the first mobile device. To avoid looping, in one implementation, SMSC 250 may store information indicating a quantity of times that a particular SMS message has been forwarded. If SMSC 250 determines that the particular SMS message has been forwarded more than a threshold quantity of times, SMSC 250 may drop (delete) the particular SMS message or may attempt to deliver the particular SMS message to one of the possible destinations. In another implementation, information may be stored in the SMS message (e.g., time to live (TTL) data) to track the quantity of times that the SMS message has been forwarded. When that information indicates that the SMS message has been forwarded more than a threshold quantity of times, the SMS message may be dropped (deleted) or delivery of the SMS message may be attempted to one of the possible destinations.

In one implementation of process 800, the SMS message may be transmitted via a circuit network. In another implementation of process 800, the SMS message may be transmitted, at least partially, via a data network. In either implementation, transmission of the SMS message may be made in a manner transparent to the user.

Billing for the SMS forwarding may be set by the wireless service provider associated with network 260. In one implementation, the wireless service provider may bill the second party for transmission of the SMS message to the original mobile device and the forwarding of the SMS message to the destination mobile device. In another implementation, the wireless service provider may bill the second party for the transmission of the SMS message to the original mobile device and may bill the first party for the forwarding of the SMS message to the destination mobile device. In yet another implementation, the wireless service provider may bill the second party for the transmission of the SMS message to the original mobile device and may provide the forwarding of the SMS message to the destination mobile device for free. In a further implementation, the wireless service provider may offer a different billing arrangement.

Figure 10:
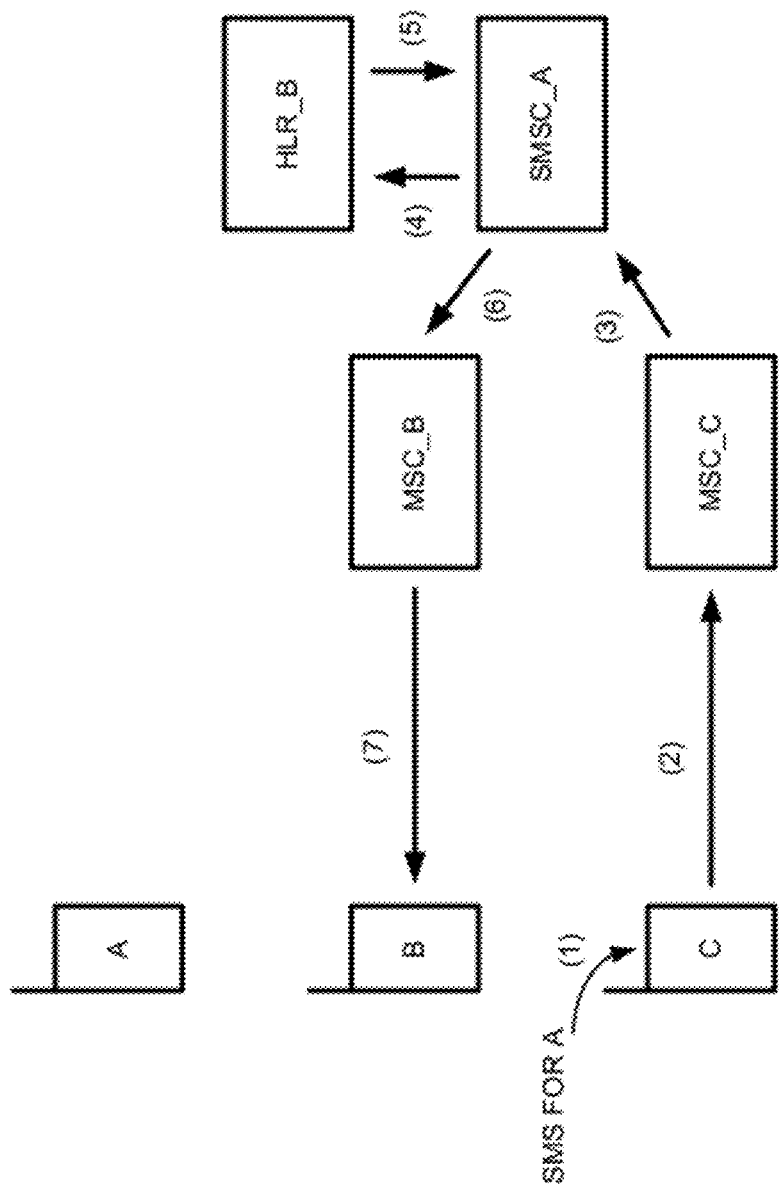
FIG. 10 illustrates an example of invoking a SMS forwarding service.

FIG. 10 illustrates an example of invoking a SMS forwarding service. As shown in FIG. 10, assume that a user, of mobile device A, desires to have SMS messages, intended for mobile device A, forwarded to mobile device B. In this case, the user may input certain information into mobile device A to express the user's desire to activate the SMS forwarding service and forward SMS messages to mobile device B, as described above with regard to FIG. 7.

Assume that a user of mobile device C wants to send a SMS message to mobile device A. The user may input a text message into mobile device C, shown as (1) in FIG. 10. The user may also input, into mobile device C, the telephone number for mobile device A. Mobile device C may generate a SMS message, based on the input from the user, and may send the SMS message to the MSC associated with mobile device C (MSC_C), shown as (2) in FIG. 7.

MSC_C may identify a SMSC associated with mobile device A (SMSC_A) based, for example, on the telephone number for mobile device A. MSC_C may send the SMS message to SMSC_A, shown as (3) in FIG. 10. SMSC_A may receive the SMS message and determine whether the user, of mobile device A, has activated the SMS forwarding service for SMS messages sent to mobile device A. For example, SMSC_A may determine whether information, stored for mobile device A, indicates that the SMS forwarding service has been activated and, if so, the identity of a mobile device to which to forward the SMS messages. In this case, assume that SMSC_A determines that SMS messages for mobile device A are to be forwarded to mobile device B.

SMSC_A may identify a HLR associated with mobile device B (HLR_B) based, for example, on the telephone number for mobile device B. SMSC_A may send a request to HLR_B, shown as (4) in FIG. 10, for information identifying a MSC associated with mobile device B (MSC_B). HLR_B may identify MSC_B based, for example, on the telephone number for mobile device B. HLR_B may send, to SMSC_A, information identifying MSC_B, shown as (5) in FIG. 10.

SMSC_A may receive the information from HLR_B and may send the SMS message to MSC_B, shown as (6) in FIG. 10. MSC_B may receive the SMS message from SMSC_A and may determine whether mobile device B is available to receive the SMS message. MSC_B may maintain or obtain information regarding the availability of mobile device B. If mobile device B is available to receive the SMS message, MSC_B may send the SMS message to mobile device B, shown as (7) in FIG. 10.

An implementation, described herein, may provide a SMS forwarding service that permits SMS messages, intended to be sent to one mobile device, to be automatically forwarded to another mobile device.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6, 8, and 9, the order of the blocks may be modified in other implementations. Further, non-dependent blocks may be performed in parallel.

In one implementation described above, a SMS message, intended to be sent to a first mobile device, is automatically forwarded to a second mobile device without being sent to the first mobile device. In another implementation, the SMS message may be forwarded to the second mobile device and also be copied to the first mobile device. In other words, the SMS message may be delivered to both mobile devices.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An automated method performed by one or more network devices, comprising:
   receiving from a user associated with a first mobile device, via a network, an instruction to activate a short message service (SMS) forwarding service for the first mobile device, the instruction including information regarding a second mobile device to which SMS messages, intended for the first mobile device, are to be forwarded;
   activating, in response to the instruction, the SMS forwarding service for the first mobile device;
   receiving, from a third mobile device, a SMS message intended for the first mobile device;
   determining, in response to the SMS message, that the SMS forwarding service has been activated for the first mobile device;
   identifying a network device associated with the second mobile device to which to forward the SMS message, intended for the first mobile device, when the SMS forwarding service has been activated for the first mobile device;
   forwarding the SMS message to the identified network device;
   receiving, from the identified network device, the forwarded SMS message for forwarding to the first mobile device;
   tracking a quantity of times that the forwarded SMS message has been forwarded, without delivery, between the first mobile device and the second mobile device; and
   dropping the forwarded SMS message when the tracked quantity of times exceeds a threshold.

2. The method of claim 1, where receiving the instruction to activate the SMS forwarding service includes:
   receiving, from the first mobile device, a message that includes a code associated with activating the SMS forwarding service, and a unique identifier for the second mobile device.

3. The method of claim 1, where activating the SMS forwarding service includes:
   receiving a password,
   determining whether the received password matches a stored password, and
   activating the SMS forwarding service when the received password matches the stored password.

4. The method of claim 1, further comprising:
   storing information, regarding the activation of the SMS forwarding service for the first mobile device, in a memory associated with a home location register (HLR) or a SMS center (SMSC).

5. The method of claim 1, where receiving the SMS message includes:
   receiving, at an SMS center (SMSC) associated with the first mobile device, the SMS message from a mobile switching center (MSC) associated with the third mobile device, and wherein forwarding the SMS message to the identified network device includes:
   routing the SMS message from the SMSC to an MSC associated with the second mobile device.

6. The method of claim 1, where determining that the SMS forwarding service has been activated for the first mobile device includes:
   analyzing the SMS message to identify identification information for the first mobile device, and
   analyzing stored information, based on the identification information for the first mobile device, to determine whether the SMS forwarding service has been activated for the first mobile device.

7. The method of claim 1, further comprising:
   locating a network device associated with the second mobile device;
   contacting the network device to identify a mobile switching center (MSC) associated with the second mobile device; and
   sending the SMS message to the MSC for delivery to the second mobile device.

8. The method of claim 1, further comprising:
   determining, by the identified network device, that the second mobile device is unavailable to receive the forwarded SMS message; and
   temporarily storing the forwarded SMS message when the second mobile device is unavailable.

9. The method of claim 8, where temporarily storing the forwarded SMS message when the second mobile device is unavailable includes:
   sending, from the identified network device, the forwarded SMS message to a SMS center (SMSC) associated with the first mobile device, and
   storing, by the SMSC, the forwarded SMS message for a period of time.

10. The method of claim 8, where temporarily storing the forwarded SMS message when the second mobile device is unavailable includes:
    sending, from the identified network device, the forwarded SMS message to a SMS center (SMSC) associated with the second mobile device, and
    storing, by the SMSC, the forwarded SMS message for a period of time.

11. A system, comprising:
    at least one network device to:
    receive from a user associated with a first mobile device, via a network, an instruction to activate a short message service (SMS) forwarding service for the first mobile device, the instruction including information regarding a second mobile device to which SMS messages, intended for the first mobile device, are to be forwarded;
    activate, in response to the instruction, the SMS forwarding service for the first mobile device;
    receive, from a third mobile device, a SMS message intended for the first mobile device;
    determine, in response to receiving the SMS message, that the SMS forwarding service has been activated for the first mobile device;
    identify a network device associated with the second mobile device to which to forward the SMS message, intended for the first mobile device, when the SMS forwarding service has been activated for the first mobile device;
    determine, based on information stored at the at least one network device, whether the SMS message has been forwarded without delivery, between the first mobile device and the second mobile device, more than a threshold number of times; and
    automatically forward the SMS message to the identified network device based on a determination that the SMS has not been forwarded more than the threshold number of times.

12. The system of claim 11, where the instruction includes a code associated with activating the SMS forwarding service, and a unique identifier for the second mobile device.

13. The system of claim 11, where the at least one network device includes a home location register (HLR) or a SMS center (SMSC), and
  where the HLR or the SMSC is to store information indicating that the SMS forwarding service has been activated for the first mobile device, and a unique identifier for the second mobile device.

14. The system of claim 11, where the at least one network device includes a mobile switch center (MSC) associated with the third mobile device and a SMS center (SMSC) associated with the first mobile device,
  where the MSC is to:
    receive the forwarded SMS message, and send the forwarded SMS message to the SMSC.

15. The system of claim 11, where, when determining that the SMS forwarding service has been activated for the first mobile device, the at least one network device is to:
  analyze the SMS message to identify identification information for the first mobile device, and
  analyze stored information, based on the identification information for the first mobile device, to determine whether the SMS forwarding service has been activated for the first mobile device.

16. The system of claim 11, where the identified network device includes a mobile switching center (MSC) associated with the second mobile device, and the at least one network device includes an SMS center (SMSC) associated with the first mobile device,
  where the SMSC is to:
    locate, based on information associated with the second mobile device, a home location register (HLR) associated with the second mobile device;
    contact the HLR to identify a mobile switching center (MSC) associated with the second mobile device; and
    send the SMS message to the MSC for delivery to the second mobile device.

17. The system of claim 11, where the identified network device is configured to:
  determine that the second mobile device is unavailable to receive the forwarded SMS message; and
  provide for temporarily storing the forwarded SMS message when the second mobile device is unavailable.

18. The system of claim 17, where the at least one network device includes a SMS center (SMSC) associated with the first mobile device, and
  where, when the second mobile device is unavailable, the SMSC is to:
    receive the forwarded SMS message from the identified network device, and
    store the forwarded SMS message for a period of time.

19. The system of claim 17, where the at least one network device includes a SMS center (SMSC) associated with the second mobile device, and
  where, when the second mobile device is unavailable, the SMSC is to:
    receive the forwarded SMS message from the identified network device, and
    store the forwarded SMS message for a period of time.

20. The system of claim 11, where, when automatically forwarding the SMS message to the identified network device, the at least one network device is further configured to:
  send the SMS message to the identified network device in connection with delivering a copy of the SMS message to the first mobile device.

21. A non-transitory computer-readable medium that stores instructions executable by one or more network devices to cause the one or more network devices to perform a method, the method comprising:
  activating a short message service (SMS) forwarding service for a first mobile device, where the SMS forwarding service forwards SMS messages, intended for the first mobile device, to a second mobile device;
  receiving, from a third mobile device, a SMS message intended for the first mobile device;
  determining, in response to the SMS message, that the SMS forwarding service has been activated for the first mobile device;
  identifying a network device associated with the second mobile device to which to forward the SMS message, intended for the first mobile device, when the SMS forwarding service has been activated for the first mobile device;
  determining, based on information stored in the SMS message, whether the SMS message has been forwarded without delivery, between the first mobile device and the second mobile device, more than a threshold number of times; and
  automatically forwarding the SMS message to the identified network device based on a determination that the SMS has not been forwarded more than the threshold number of times.

22. The computer-readable medium of claim 21, where the method further comprises:
  determining that the second mobile device is unavailable to receive the forwarded SMS message;
  sending the forwarded SMS message to a SMS center (SMSC) associated with the second mobile device; and
  temporarily storing, by the SMSC, the forwarded SMS message.

23. The computer-readable medium of claim 21, where the method further comprises:
  determining that the second mobile device is unavailable to receive the forwarded SMS message;
  sending the forwarded SMS message to a SMS center (SMSC) associated with the first mobile device; and
  temporarily storing, by the SMSC, the forwarded SMS message.

24. The computer-readable medium of claim 21, where automatically forwarding the SMS message to the second mobile device includes:
  sending the SMS message to the identified network device in connection with delivering a copy of the SMS message to the first mobile device.

* * * * *